United States Patent [19]

Takemasa et al.

[11] Patent Number: 5,348,441
[45] Date of Patent: Sep. 20, 1994

[54] PARTS TRAY CONVEYING SYSTEM

[75] Inventors: Kazuo Takemasa, Tokyo; Shoichi Hayashi, Chiba; Tsuyoshi Inoue; Hideo Tanaami, both of Kanagawa, all of Japan

[73] Assignee: Sony Corporation, Tokyo, Japan

[21] Appl. No.: 683,189

[22] Filed: Apr. 10, 1991

[30] Foreign Application Priority Data

Apr. 13, 1990 [JP] Japan .................. 2-98254

[51] Int. Cl.⁵ .............................. B65G 60/00
[52] U.S. Cl. .................. 414/796.7; 414/795.8; 414/788.8; 414/788.7
[58] Field of Search ............ 414/788.4, 796.7, 788.7, 414/795.8, 750, 751, 752, 753

[56] References Cited

U.S. PATENT DOCUMENTS

| 4,541,762 | 9/1985 | Tischler et al. ............ 414/788.7 |
| 4,588,341 | 5/1986 | Motoda ..................... 414/788.4 |
| 4,687,403 | 8/1987 | Motoda ..................... 414/788.7 X |
| 4,720,228 | 1/1988 | Horiguchi et al. . |

FOREIGN PATENT DOCUMENTS

| 0387487 | 1/1990 | European Pat. Off. . |
| 3225280 | 1/1984 | Fed. Rep. of Germany . |
| 3447289 | 6/1986 | Fed. Rep. of Germany . |
| 12524 | 1/1986 | Japan .................. 414/788.8 |
| 1632 | 1/1988 | Japan .................. 414/788.4 |
| 202521 | 8/1988 | Japan .................. 414/788.4 |
| 208432 | 8/1988 | Japan .................. 414/788.7 |
| 247221 | 10/1988 | Japan .................. 414/788.7 |
| 43420 | 2/1989 | Japan .................. 414/788.4 |
| 115526 | 5/1989 | Japan .................. 414/788.7 |
| 2124941 | 2/1984 | United Kingdom . |
| 2148260 | 5/1985 | United Kingdom . |

Primary Examiner—Michael S. Huppert
Assistant Examiner—James Keenan
Attorney, Agent, or Firm—Lewis H. Eslinger; Jay H. Maioli

[57] ABSTRACT

A parts tray conveying system includes a first station for supplying a plurality of occupied trays each containing parts under a stacked condition; a second station for separating the occupied trays under the stacked condition one by one from the upper stage; and a third station for conveying the occupied trays. Also provided is a device for taking an upper-most one of the occupied trays under the stacked condition from the second station to the third station; a fourth station for discharging a plurality of empty trays each containing no parts one by one from the third station; and a fifth station for stacking the empty trays discharged by the fourth station. Accordingly, a large number of the parts trays can be compactly set under the stacked condition in the conveying system to thereby effectively utilize space in the conveying system.

8 Claims, 14 Drawing Sheets

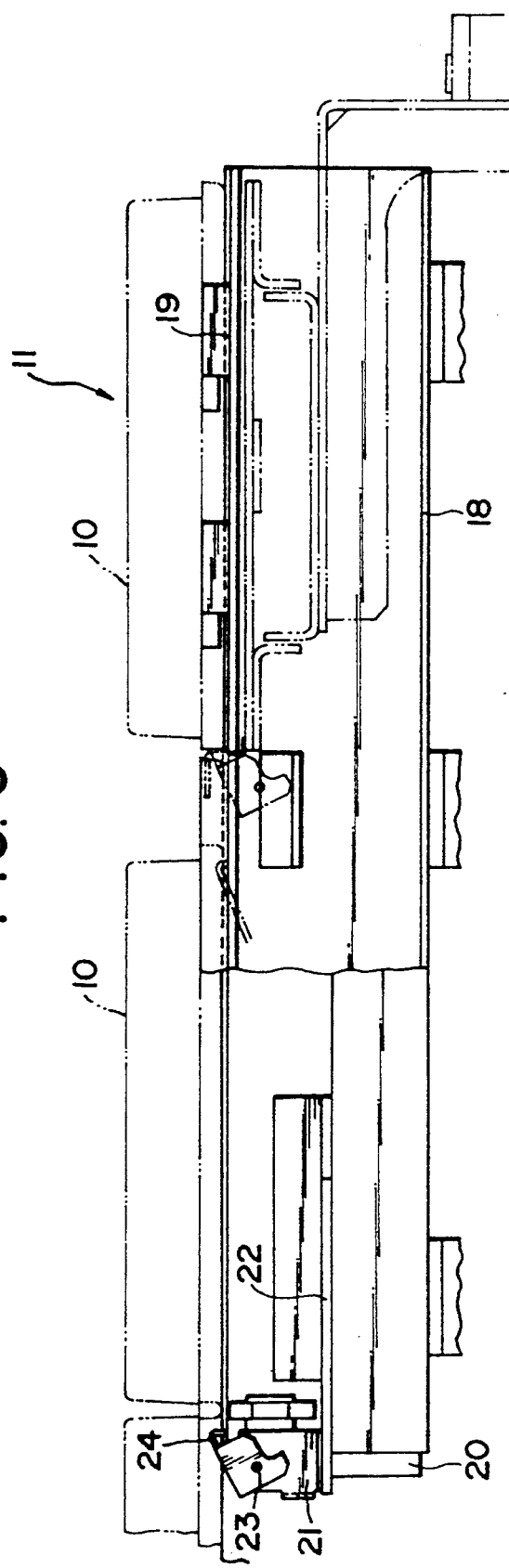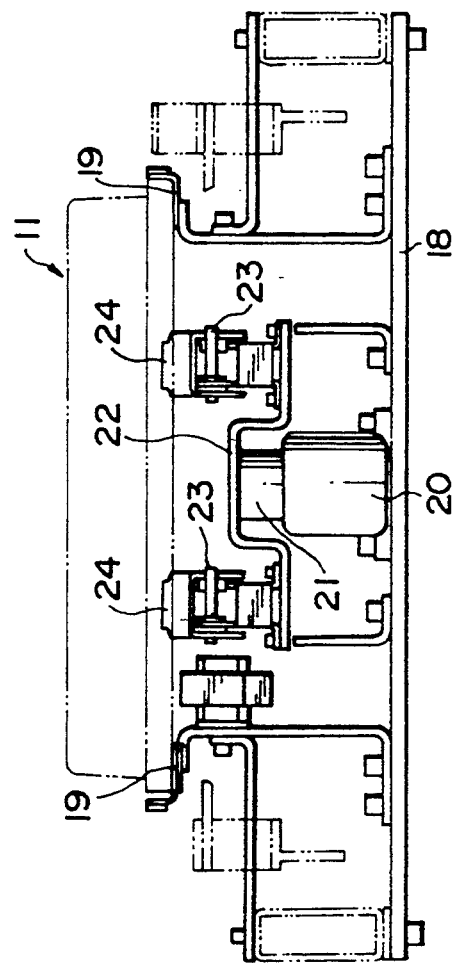

PARTS TRAY CONVEYING SYSTEM

BACKGROUND OF THE INVENTION

The present invention relates to a parts tray conveying system, and more particularly to a parts tray conveying system suitable for use with an automatic assembly system employing a robot, wherein a plurality of parts trays each containing parts are supplied to a predetermined position.

In carrying out an assembly operation by using an automatic machine such as an assembly robot, parts to be employed for the assembly operation need to be preliminarily supplied to a predetermined position. An apparatus for supplying the parts is disclosed in Japanese Patent Laid-open Publication No. 63-306108, for example. In the conventional parts supply apparatus, the parts are preliminarily accommodated in a tray, and a plurality of trays containing the parts are supplied to a predetermined position. The robot open rates to pick up the parts one by one from each tray and carry out the automatic assembly operation.

However, such a parts supply apparatus has a shortcoming such that the trays containing the parts are preliminarily separated from each other at intervals in a tray box, so that a large space is necessary in the parts supply apparatus. Accordingly, the parts supply apparatus becomes large in size

SUMMARY OF THE INVENTION

It is accordingly an object of the present invention to provide a parts tray conveying system which can effectively utilize a space for a plurality of parts trays.

According to the present invention, there is provided a parts tray conveying system comprising a first station for supplying a plurality of occupied trays each containing parts under a stacked condition; a second station for separating said occupied trays under the stacked condition one by one; a third station for conveying said occupied trays to a predetermined position; means for moving said occupied trays under the stacked condition from said first station to said second station; means for taking an uppermost one of said occupied trays under the stacked condition from said second station to said third station; a fourth station for discharging a plurality of empty trays one by one from said third station; a fifth station for stacking said empty trays discharged by said fourth station; and means for carrying said empty trays under a stacked condition from said fifth station.

With this construction, the occupied trays are supplied under the stacked condition from the first station to the second station, and the uppermost one of the occupied trays under the stacked condition is separated one by one to be supplied from the second station to the third station. Accordingly, it is not necessary to preliminarily separate the plurality of occupied trays from each other at intervals. As a result, a large number of the occupied trays can be set in the conveying system by effectively utilizing the space in the conveying system, thus improving the space factor and making the construction compact.

Other objects and features of the invention will be more fully understood from the following detailed description and appended claims when taken with the accompanying drawings.

BRIEF DESCRIPTION OF THE DRAWINGS

FIG. 5 is an elevational view of FIG. 4;
FIG. 6 is a side view of FIG. 4.

DETAILED DESCRIPTION OF THE PREFERRED EMBODIMENTS

Figure 1:
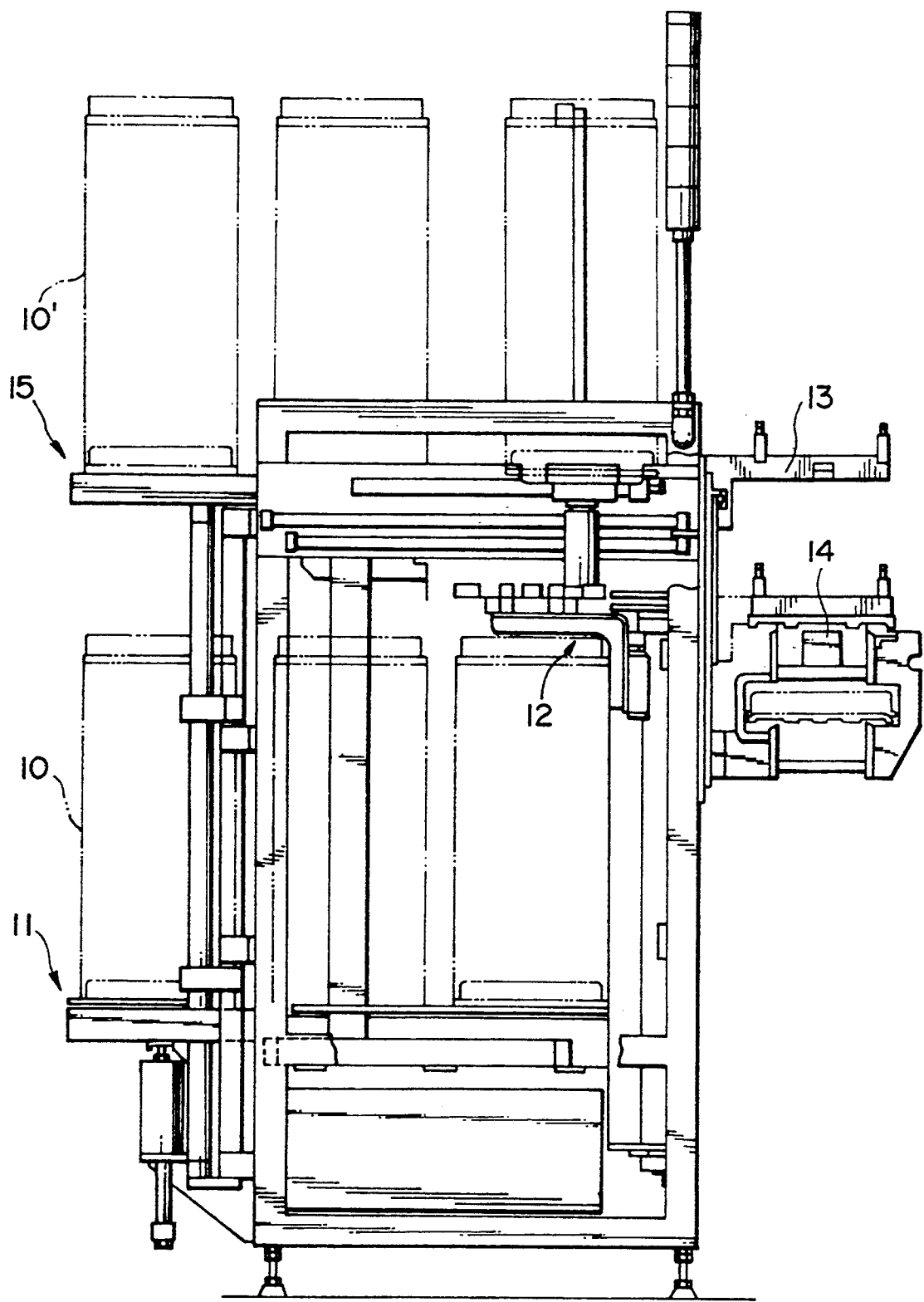
FIG. 1 is an elevational view of the parts tray conveying system according to a preferred embodiment of the present invention, showing a general construction.
Figure 2:
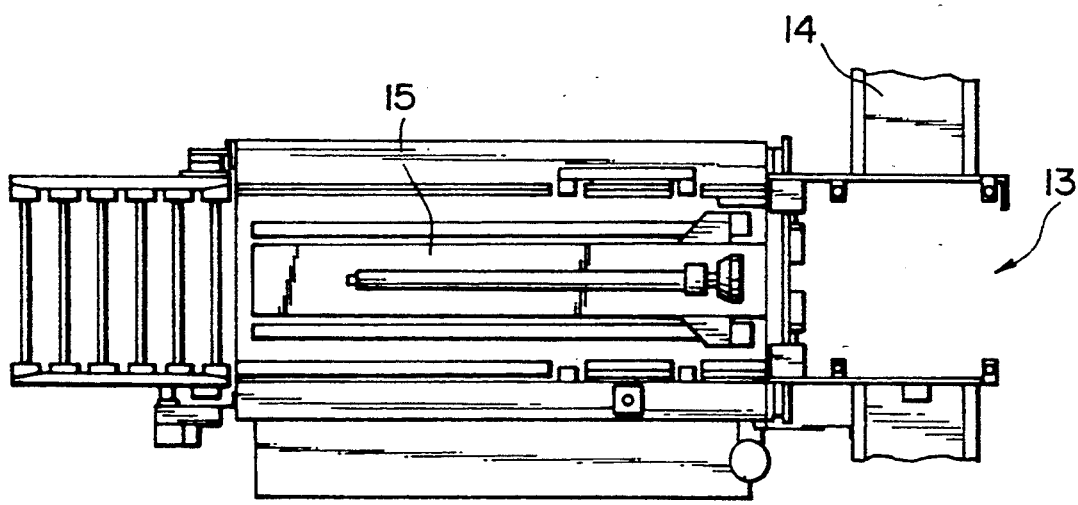
FIG. 2 is a plan view of FIG. 1.
Figure 3:
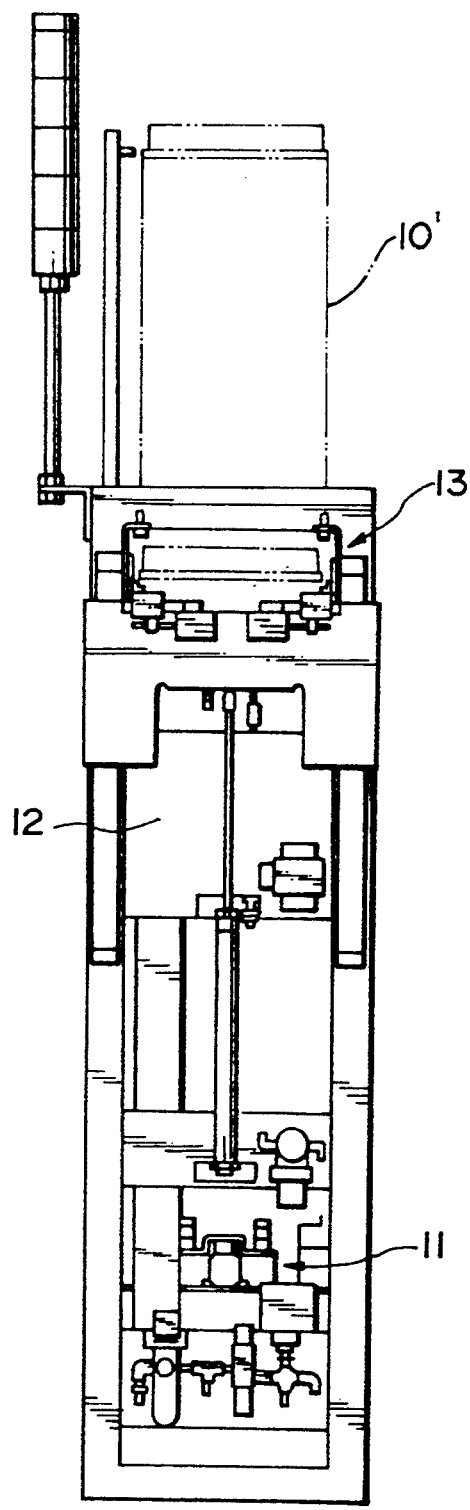
FIG. 3 is a side view of FIG. 1.

There will first be described a general construction of the parts tray conveying system according to a preferred embodiment of the present invention with reference to FIGS. 1 to 3. Referring to FIGS. 1 to 3, the parts tray conveying system is provided with a tray supply unit 11 for supplying a plurality of occupied trays 10 each containing parts under a stacked condition. There is provided above the fray supply unit 11 an elevator 12 for separating an upper-most one of the occupied trays 10 under the stacked condition and upwardly moving the uppermost occupied tray 10. There is provided above the elevator 12 a chuck unit 13 for taking a plurality of empty trays 10′ one by one from a conveyor 14 and also supplying the upper-most occupied tray 10 separated by the elevator 12 to the conveyor 14. There is provided next to the chuck unit 13 a tray discharge unit 15 for discharging the empty tray 10′ from the chuck unit 13. In the tray discharge unit 15, the empty trays 10′ are stacked in the same manner as the occupied trays 10 in the tray supply unit 11.

Figure 4:
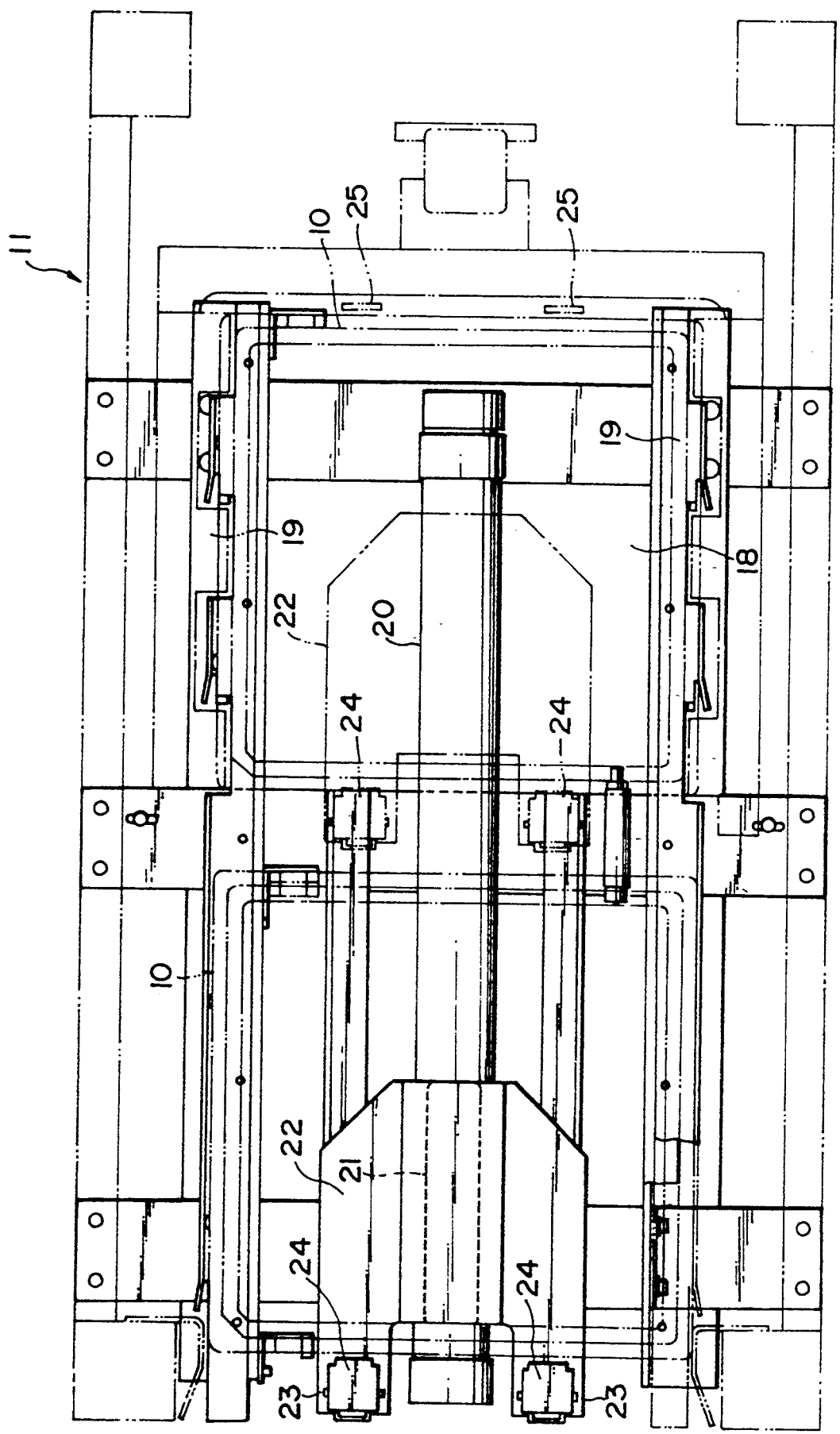
FIG. 4 is a plan view of a tray supply unit shown in FIG. 1.

A structure of the tray supply unit 11 will now be described with reference to FIGS. 4 to 6. The tray supply unit 11 is provided at its bottom with a base 18. A pair of right and left guide rails 19 are provided on the base 18. An air cylinder 20 is provided at the intermediate position between the right and left guide rails 19. A mounting plate 22 is mounted on a movable member 21 of the air cylinder 20. A pair of hooks 24 are rotatably mounted through a pair of pins 23 to a left end portion of the mounting plate 22 as viewed in FIGS. 4 and 5. The hooks 24 are rotatably supported in such a manner that when the mounting plate 22 is moved leftwardly as viewed in FIG. 4, the hooks 24 are not engaged with the occupied trays 10, while once the occupied trays 10 come to a predetermined position in the tray supply unit 11, the hooks 24 are brought into engagement with the left end of the occupied trays 10 as viewed in FIG. 4. Further, a pair of stoppers 25 for limiting the rightward movement of the occupied trays 10 after being drawn to a predetermined position is provided at a right end portion of the tray supply unit 11 as viewed in FIG. 4.

Figure 7:
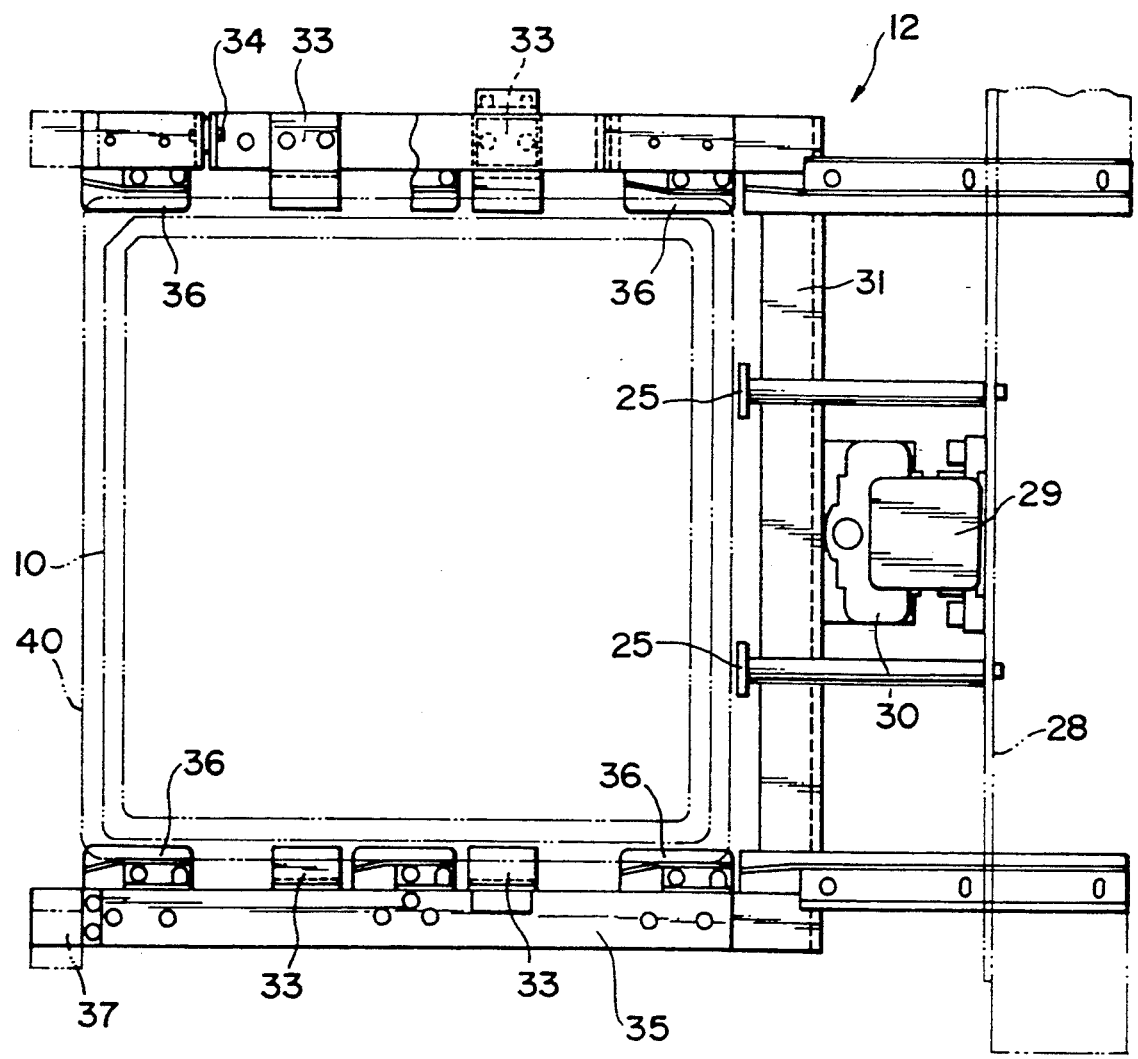
FIG. 7 is a plan view of an elevator shown in FIG. 1.
Figure 8:
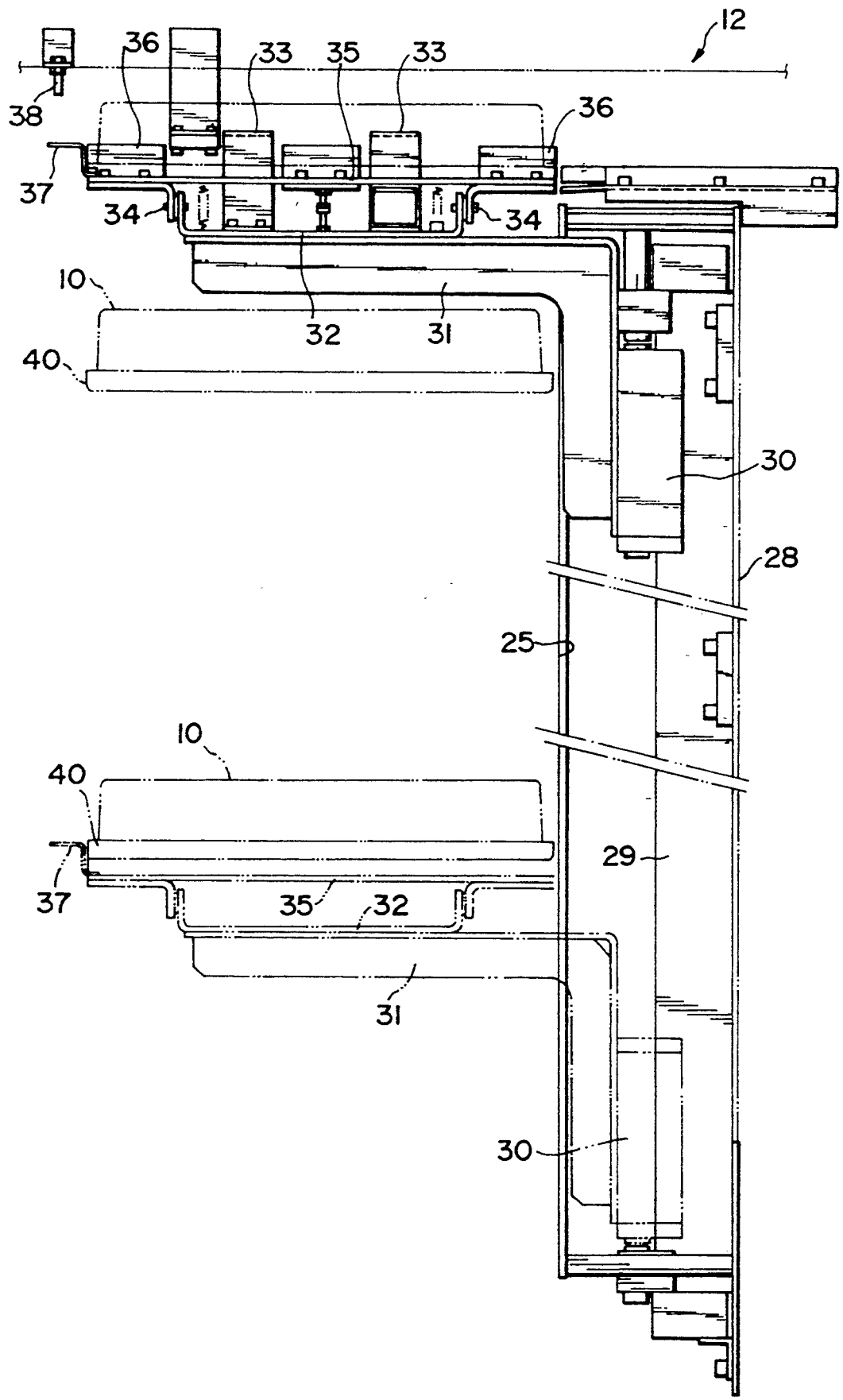
FIG. 8 is an elevational view of FIG. 7.
Figure 9:
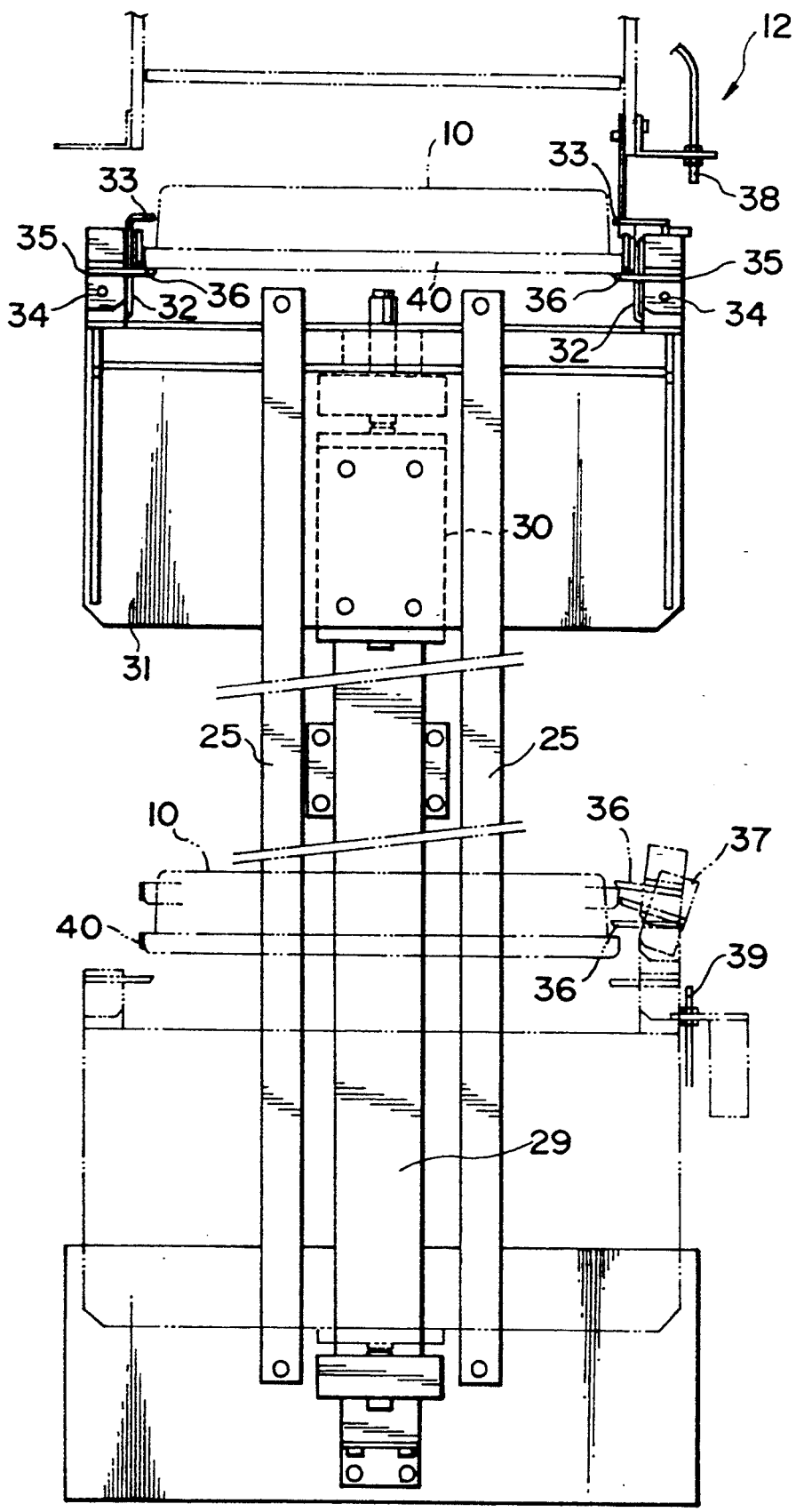
FIG. 9 is a side view of FIG. 7.

There will now be described a structure of the elevator 12 for separating an uppermost one of the plurality occupied trays 10 under the stacked condition supplied by the tray supply unit 11 with reference to FIGS. 7 to 9. The elevator 12 is provided with a vertically extending frame 28. An air cylinder 29 is supported under an erected condition by the frame 28. The air cylinder 29 has no rod, and a movable member 30 is slidably supported to the air cylinder 29. An elevating member 31 is mounted to the movable member 30, A pair of mounting brackets 32 is provided on opposite side portions of the elevating frame 31. A pair of upper pressers 33 are fixed on each mounting bracket 32.

Figure 10:
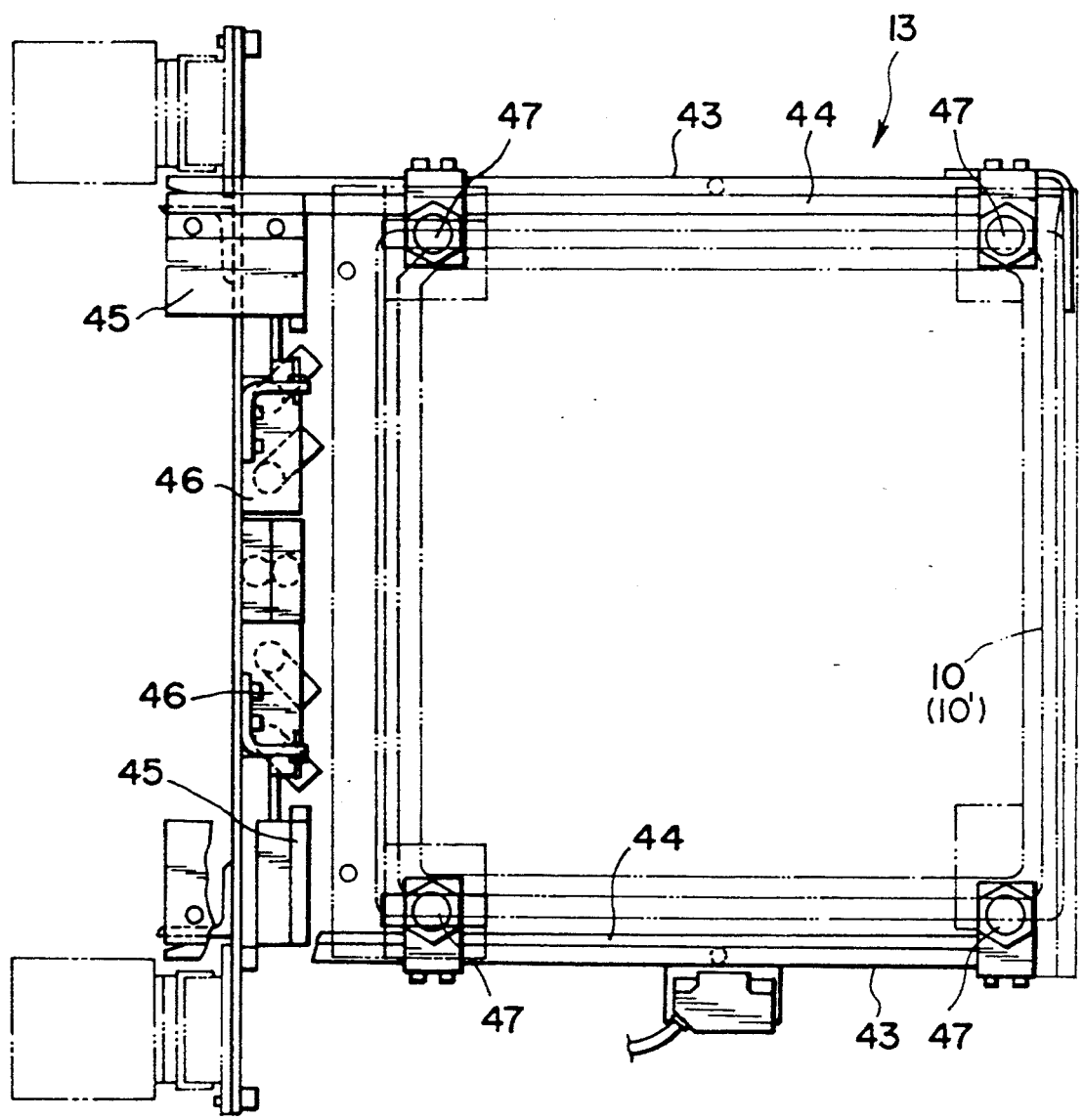
FIG. 10 is a plan view of a chuck unit shown in FIG. 1.
Figure 11:
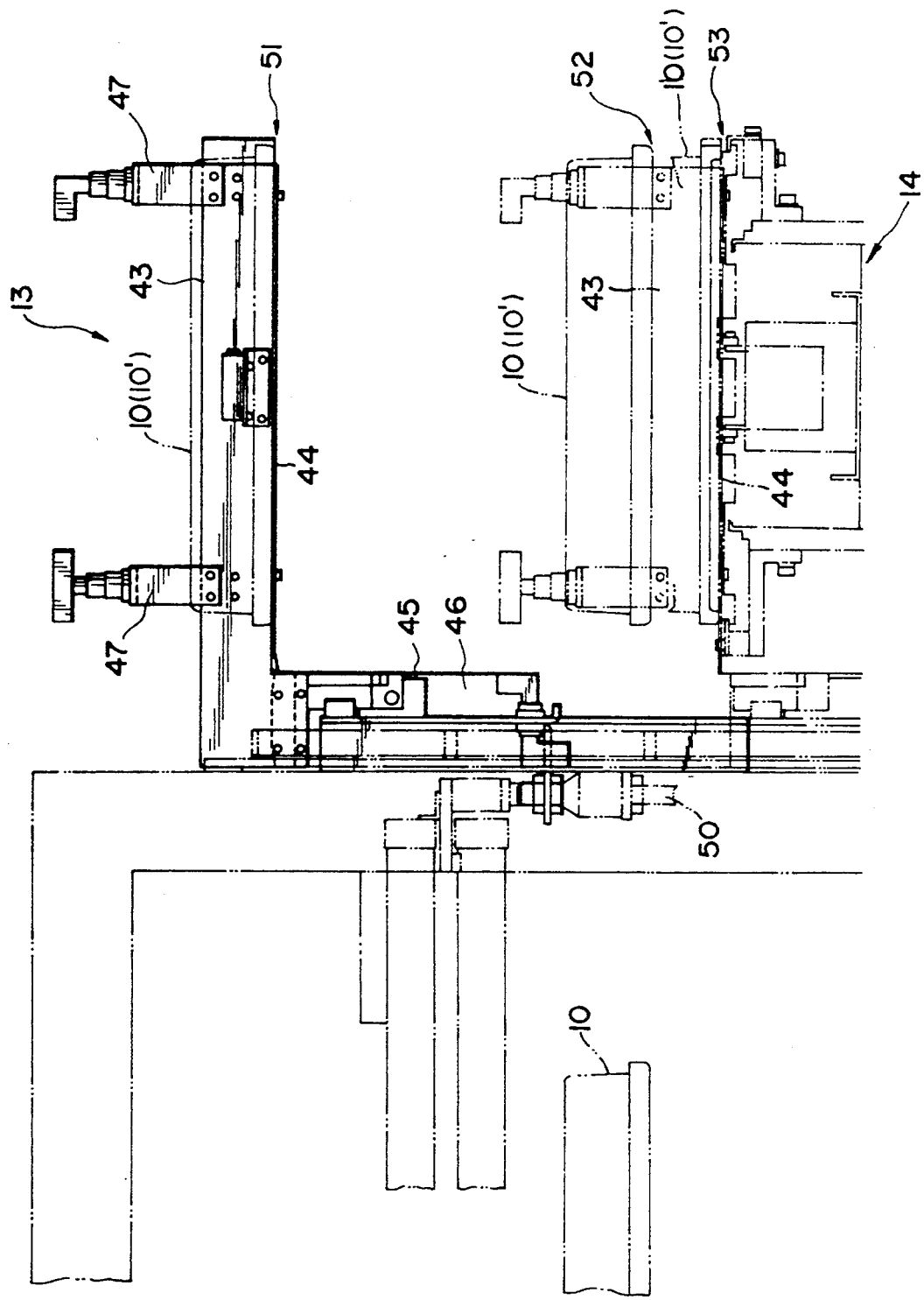
FIG. 11 is an elevational view of FIG. 10.
Figure 12:
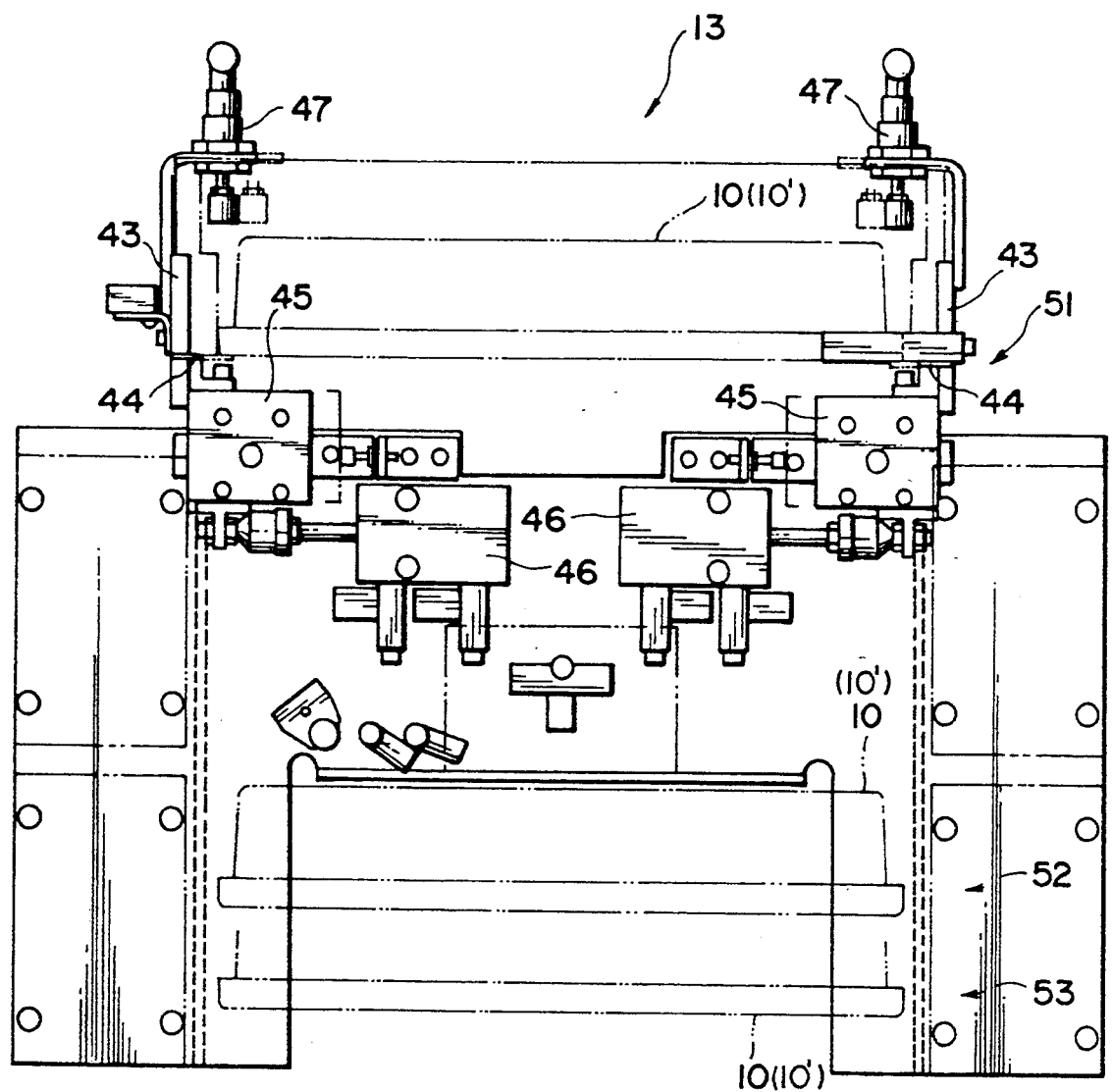
FIG. 12 is a side view of FIG. 10.

A pair of rotatable plates 35 are mounted through a pair of pins 34 to each mounting bracket 32, A pair of lower pressers 36 are mounted on each rotatable plate 35. A sensing member 37 projects from one of the two lower pressers 36 on the front side of the elevator 12. A light emitting element 38 and a sensor 39 are provided at upper and lower portions respectively of the elevator 12 so as to form a light path therebetween and detect rotation of the sensing member 37, Each occupied tray 10 is formed at its lower periphery with a flange 40 adapted to be retained by the upper pressers 33 and the lower pressers 36, There will now be described a structure of the chuck unit 13 for taking the empty tray 10′ from the conveyor 14 to the tray discharge unit 15 or supplying the occupied tray 10 from the elevator 12 to the conveyor 14 with reference to FIGS. 10 to 12. The chuck unit 13 is provided with a pair of right and left chuck members 43. Each chuck member 43 is provided at its lower portion with a tray receiving plate 44. Each chuck member 43 is connected through a block 45 to an air cylinder 46 for opening and closing the chuck member 43. Further, each chuck member 43 is provided at its front and rear end portions with a pair of air cylinders 47 for pushing the occupied tray 10 to the conveyor 14. Further, an air cylinder 48 for introducing the occupied tray 10 from the elevator 12 to the chuck unit 13 is provided under the tray discharge unit 15 (see FIGS. 14 and 15):

As shown in FIG. 11, both the chuck members 43 constituting the chuck unit 13 are connected to a rod 50 of a vertically extending air cylinder (not shown). By the vertical movement of the rod 50 of the air cylinder, the chuck unit 13 is vertically moved to take three positions, i.e., an upper position 51, a middle position 52 and a lower position 53 as shown in FIGS. 11 and 12.

There will now be described a structure of the tray discharge unit 15 for discharging the empty tray 10′ from the chuck unit 13 with reference to FIGS. 13 to 15. The tray discharge unit 15 is provided with a pair of right and left rails 56. An air cylinder 57 for drawing the empty tray 10′ from the chuck unit 13 is provided between the right and left rails 56. A drawing hook 58 is adapted to be moved by the air cylinder 57, and is rotatably supported through a pair of pins 59. Further, an air cylinder 60 for discharging the empty trays 10′ under the stacked condition from the tray discharge unit 15 to the outside is provided under the air cylinder 57. A mounting plate 61 is adapted to be moved by the air cylinder 60, and a pair of hooks 63 are rotatably supported through a pair of pins 62 to the mounting plate 61 at opposite side portions thereof, Further, the tray discharge unit 15 is provided with a pair of right and left air cylinders 65 for lifting and lowering the empty trays 10′ under the stacked condition. A bracket 66 is mounted to a rod of each air cylinder 65. A pair of retainer plates 68 are rotatably supported through a pair of pins 67 to each bracket 66.

The operation of the parts tray conveying system as mentioned above will now be described.

First, the occupied trays 10 under the stacked condition are set at the left end portion of the tray supply unit 11 as shown in FIG. 1 by hands or an automatic carrier vehicle. Under this condition, the air cylinder 20 in the tray supply unit 11 shown in FIGS. 4 to 6 is operated to move the mounting plate 22 leftwardly as viewed in FIGS. 4 and 5 until the hooks 24 rotatably supported to the mounting plate 22 comes into engagement with the left end of the occupied trays 10 under the stacked condition. Then, the mounting plate 22 is moved rightwardly as viewed in FIGS. 4 and 5 by the air cylinder 20 to thereby draw the occupied trays 10 engaged with the hooks 24 to a predetermined position where the right end of the occupied trays 10 comes into abutment against the stoppers 25. That is, when the occupied trays 10 come into abutment against the stoppers 25, the operation of the air cylinder 20 is stopped to prevent the rightward movement of the mounting plate 22. The above predetermined position is directly under the elevator 12. In the tray supply unit 11, there is defined a preparatory space for storing another set of the occupied trays 10 under the stacked condition as shown in FIG. 1. The preparatory space is defined adjacent to the set of the occupied trays 10 under the stacked condition positioned just under the elevator 12, so that the occupied trays 10 stored in the preparatory space await supply to the predetermined position just under the elevator 12. Thus, a large number of the occupied trays 10 can be stored in the tray supply unit 11.

After the occupied trays 10 under the stacked condition are supplied to the predetermined position directly under the elevator 12, an uppermost one of the occupied trays 10 is separated and picked up by the elevator 12. That is, when the elevating frame 31 is lowered through the movable member 30 by the air cylinder 29, the lower pressers 36 provided at the opposite side portions of the frame 31 are brought into abutment against the flange 40 of the uppermost occupied tray 10, and are then rotated about the pins 34 as shown by a phantom line in FIG. 9. Then, the lower pressers 36 get over the flange 40 of the uppermost occupied tray 10 to come to rest just under the flange 40.

During the above lowering operation of the lower pressers 36, when the lower pressers 36 are rotated together with the rotatable plates 35, the light path from the light emitting element 38 to the sensor 39 is cut off by the sensing member 37, thereby detecting that the lower pressers 36 have gotten over the flange 40 of the uppermost occupied tray 10. Simultaneously with such a detecting operation, the air cylinder 29 is switched from the lowering operation to a lifting operation of the elevating frame 31. As a result, the uppermost occupied tray 10 is lifted under the condition where the flange 40 of the tray 10 is sandwiched by the upper pressers 33 and the lower pressers 36 provided on the elevating frame 31 as shown in FIGS. 8 and 9.

Thus, according to the preferred embodiment, the uppermost one of the occupied trays 10 under the stacked condition positioned directly under the elevator 12 is separated and moved upwardly one by one. As the occupied trays 10 under the stacked condition can be positioned under the elevator 12, a large number of the occupied trays 10 can be compactly stored in the parts tray conveying system as shown in FIG. 1. Accordingly, extra space can be eliminated to improve the space factor of the parts tray conveying system and make the construction more compact.

In the next step, the empty tray 10' is discharged from the conveyor 14 to the tray discharge unit 15 by the chuck unit 13 before supplying the occupied tray 10 from the elevator 12 through the chuck unit 13 to the conveyor 14. That is, the chuck members 43 in the chuck unit 13 are lowered to the lower position 53 shown in FIGS. 11 and 12 by the air cylinder having the rod 50. At the lower position 53, the chuck members 43 are closed by the air cylinders 46 to grip the empty tray 10' placed on the conveyor 14. Then, the chuck members 43 gripping the empty tray 10' are lifted to the upper position 51 shown in FIGS. 11 and 12 by the air cylinder having the rod 50.

Figure 13:
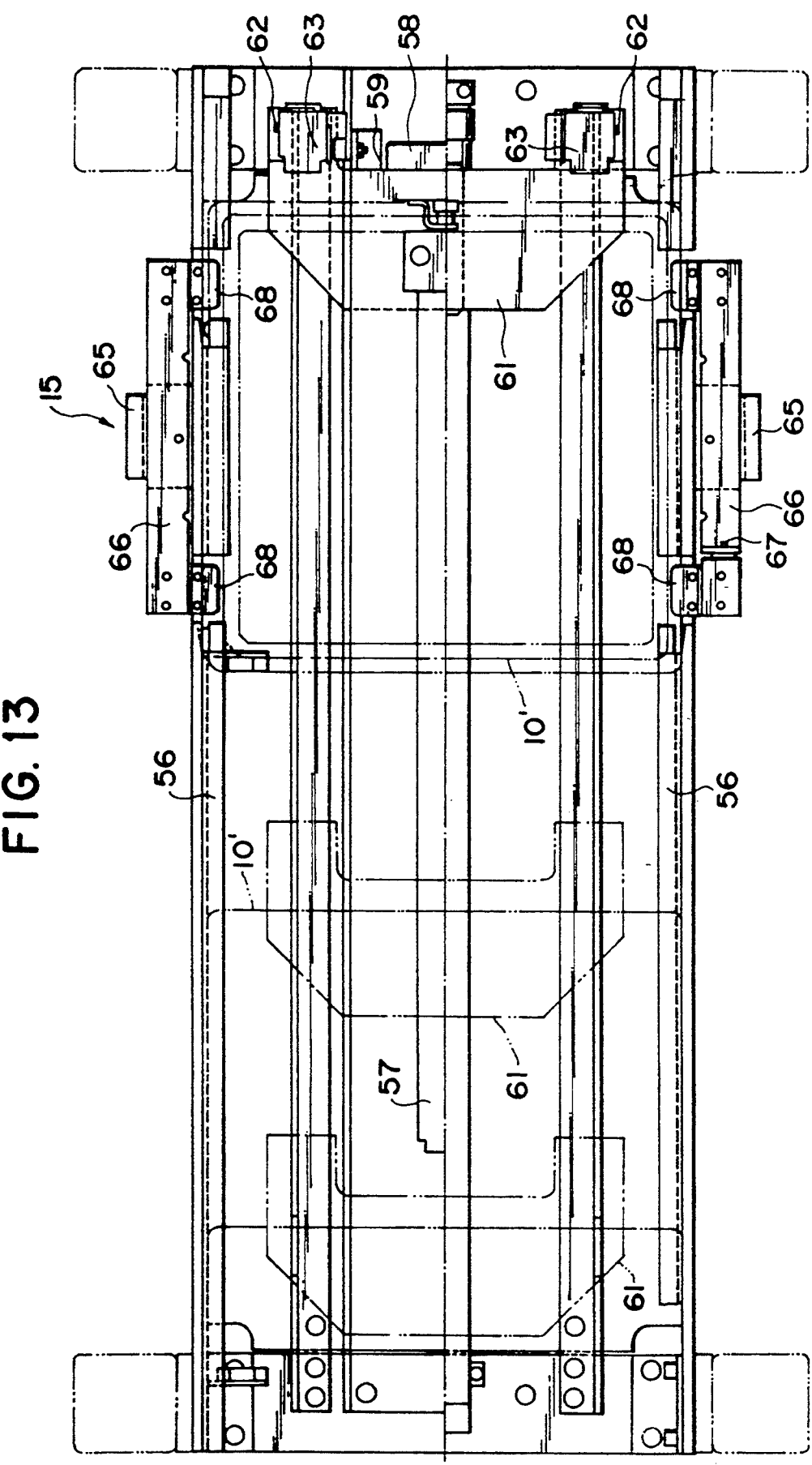
FIG. 13 is a plan view of a tray discharge unit shown in FIG. 1.
Figure 14:
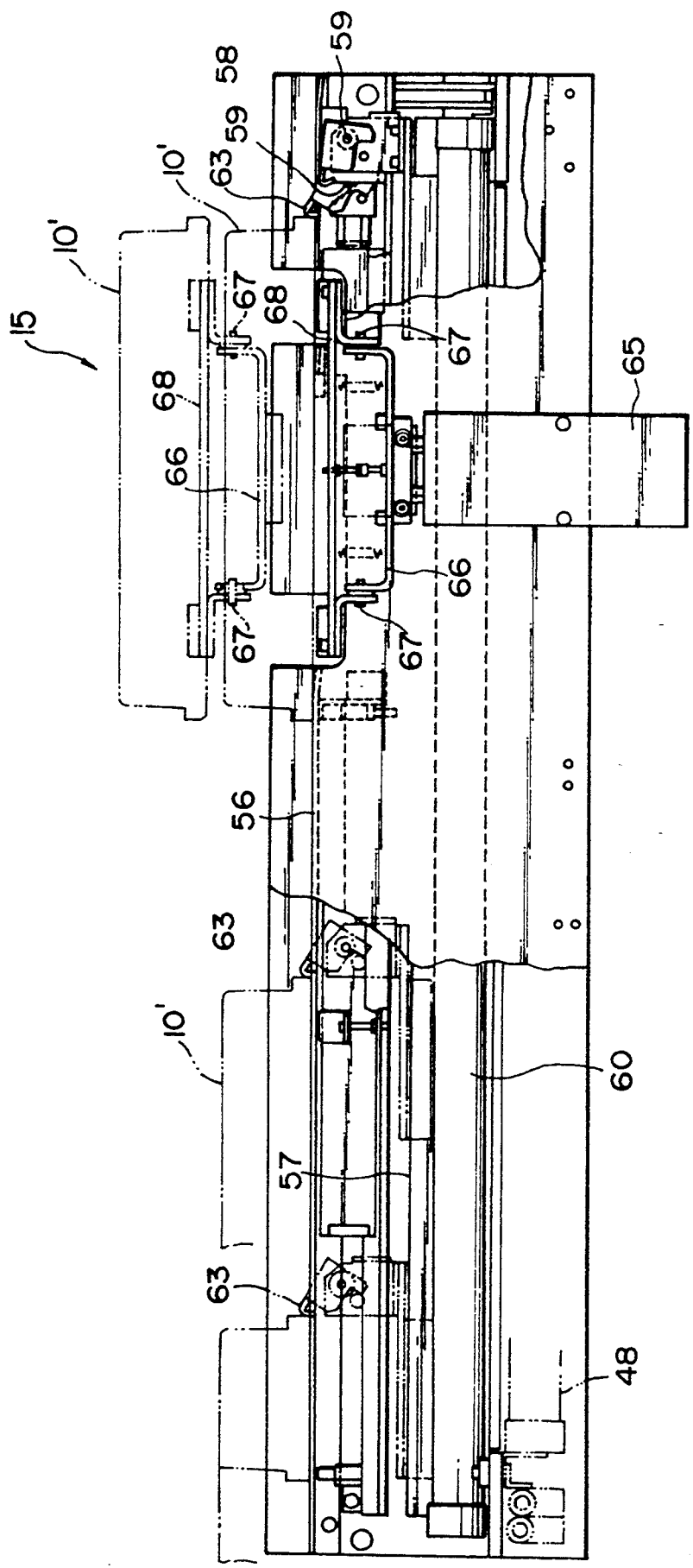
FIG. 14 is an elevational view of FIG. 13.
Figure 15:
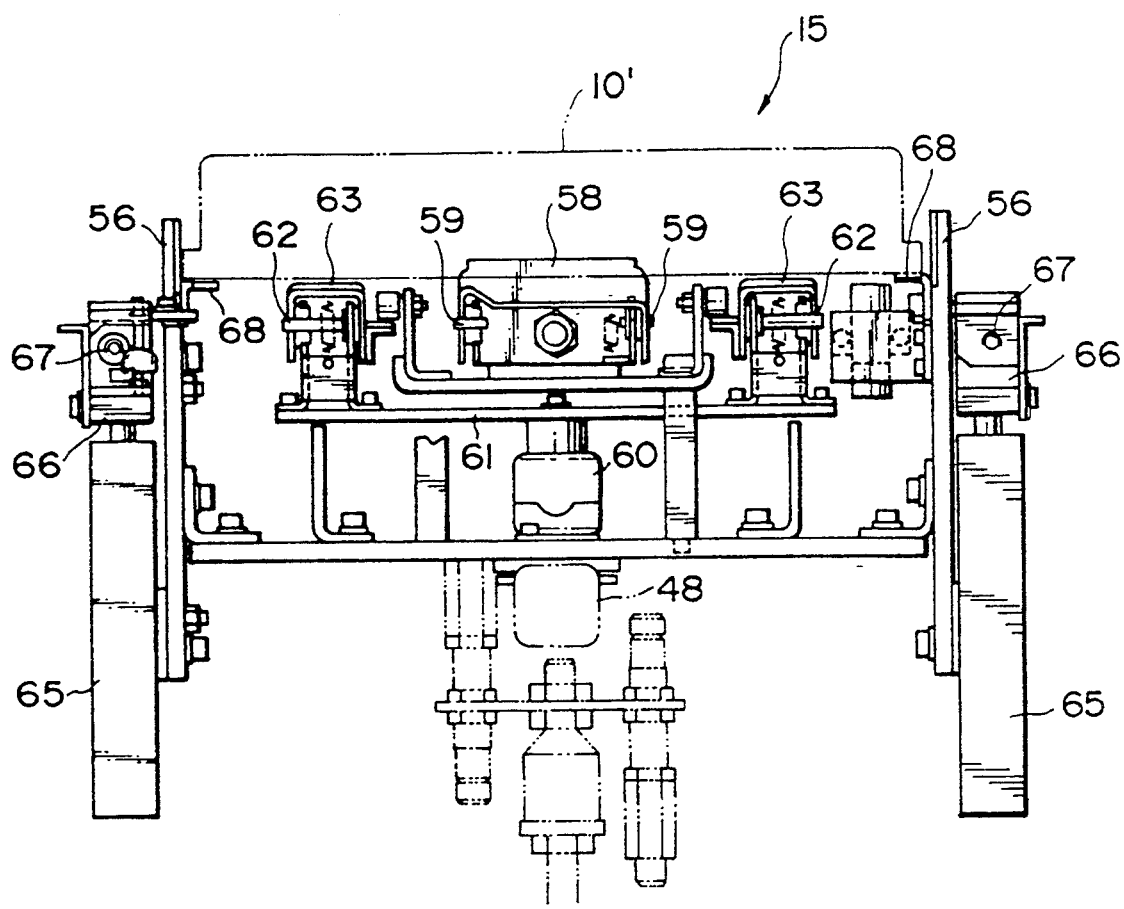
FIG. 15 is a side view of FIG. 13.

At the upper position 51, the air cylinder 57 in the tray discharge unit 15 shown in FIGS. 13 to 15 is operated to draw the empty tray 10' from the chuck unit 13 to the tray discharge unit 15 by engaging the drawing hook 58 with the empty tray 10'. This drawing operation is followed by a subsequent discharging operation such that the air cylinder 60 is operated to discharge the empty trays 10' under the stacked condition by engaging the hooks 63 mounted on the mounting plate 61 with the empty tray 10'.

In the case that the empty trays 10' under the stacked condition have been already positioned in the tray discharge unit 15 before carrying out the discharging operation of the empty tray 10' from the chuck unit 13, the new empty tray 10' discharged from the chuck unit 13 is inserted just under a lower-most one of the empty trays 10' already stored under the stacked condition. This operation is carried out by operating the air cylinders 65.

That is, the empty trays 10' under the stacked condition are first lifted by operating the air cylinders 65. More specifically, the air cylinders 65 are operated to lower the brackets 66. During the lowering operation of the brackets 66, the retainer plates 68 rotatably supported through the pins 67 to the brackets 66 are brought into abutment against the flanges 40 of the empty trays 10', and are then rotated so as to get over the flanges 40. When the retainer plates 68 finally get over the flange 40 of the lowermost empty tray 10', the air cylinders 65 are switched to lift the retainer plates 68 through the brackets 66 as shown by a phantom line in FIG. 14. Thus, there is defined a space for inserting the new empty tray 10' under the lower-most empty tray 10'. Under this condition, the air cylinder 57 is operated to draw the new empty tray 10' from the chuck unit 13 into the above space by engaging the hook 58 with the new empty tray 10'. Then, the air cylinders 65 are operated again to lower the retainer plates 68, thereby stacking the already stacked empty trays 10' onto the new empty tray 10' drawn as mentioned above.

After discharging the empty tray 10' from the conveyor 14 through the chuck unit 13 to the tray discharge unit 15, the chuck unit 13 is lowered to the middle position 52 shown in FIGS. 11 and 12 by the air cylinder having the rod 50. At the middle position 52, the air cylinder 48 is operated to horizontally transfer the uppermost occupied tray 10 from the elevator 12 to between the chuck members 43 in the chuck unit 13. Then, the chuck members 43 having thus received the occupied tray 10 are lowered to the lower position 53 by the air cylinder having the rod 50. Then, the air cylinders 47 in the chuck unit 13 are operated to transfer the occupied tray 10 from the chuck members 43 to the conveyor 14. Then, the occupied tray 10 is conveyed to an assembly system by the conveyor 14.

As described above, the empty trays 10' are returned from the assembly system through the conveyor 14 to the tray discharge unit 15, and simultaneously the occupied trays 10 are supplied from the tray supply unit 11 through the conveyor 14 to the assembly system. Such a series of operations is automatically carried out. In supplying the occupied trays 10, the uppermost one of the occupied trays 10 under the stacked condition is separated by the elevator 12. Further, in discharging the empty trays 10', the already stacked empty trays 10' in the tray discharge unit 15 are once lifted by the air cylinders 65 and the retainer plates 68 to define a space corresponding to a height of the new empty tray 10' to be discharged from the conveyor 14 to the tray discharge unit 15, and then the new empty tray 10' is inserted into the space. Accordingly, by employing the parts tray conveying system according to the preferred embodiment of the present invention, the occupied trays 10 can be applied under the stacked condition to the assembly system, and the empty trays 10' can also be discharged under the stacked condition.

In the parts tray conveying system according to the preferred embodiment, after the occupied trays 10 under the stacked condition are set into this conveying system by hands or an automatic carrier vehicle, the uppermost one of the occupied trays 10 under the stacked condition is separated one by one by the elevator 12 to be supplied to the automatic assembly system. Furthermore, the empty trays 10' returned from the automatic assembly system are discharged under the stacked condition in the same manner as the occupied trays 10. Accordingly, the occupied trays 10 contained in a carton or the like can be simply and easily applied under the stacked condition to the assembly system. Further, the empty trays 10' can be put into the carton under the stacked condition, thereby eliminating hand stacking work and to widely optimize the conveyance of the parts trays.

Although the occupied tray 10 is transferred to the conveyor 14 by the chuck unit 13 in the above preferred embodiment, the occupied tray 10 may be directly supplied to the assembly system by the chuck unit 13.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A parts tray conveying system comprising:
   a first station for supplying a plurality of occupied trays under a stacked condition each containing parts;
   a second station for separating an uppermost one of said occupied trays under the stacked condition one by one and including elevator means for vertically moving said separated uppermost one of said occupied trays, said elevator means having a vertically movable member, an elevating member attached to said vertically movable member, a plurality of mounting brackets attached to said elevating member, a plurality of rotatable plates mounted to said mounting brackets, a sensing member projecting from one of said plurality of rotatable plates, and a light emitting element and a sensor provided at an upper and lower portion, respectively, of said elevator means so as to form a light path therebetween for detecting rotation of said sensing member;

a third station for conveying said separated uppermost one of said occupied trays to a predetermined position;

means for moving said occupied trays under the stacked condition from said first station to said second station;

means for taking said uppermost one of said occupied trays under the stacked condition from said second station to said third station;

a fourth station for removing and discharging a plurality of empty trays each containing no parts one by one from said third station;

a fifth station for stacking said empty trays discharged by said fourth station; and means for carrying said empty trays under a stacked condition from said fifth station.

2. The parts tray conveying system as defined in claim 1 further comprising a sixth station for awaiting supply of a set of said occupied trays under the stacked condition to said first station, said sixth station being located adjacent said first station.

3. The parts tray conveying system as defined in claim 1, wherein said fifth station includes means for inserting said empty trays one by one into a stack below a lowermost one of said empty trays already stacked.

4. The parts tray conveying system as defined in claim 1, wherein said fifth station is located just above said first station and said second station.

5. The parts tray conveying system as defined in claim 1, wherein said first station comprises:
 a base;
 a pair of guide rails situated on said base;
 an air cylinder provided at an intermediate position between said guide rails;
 a mounting plate;
 a plurality of hooks rotatably mounted to an end portion of said mounting plate; and
 a plurality of stoppers for limiting movement of said occupied trays upon reaching a predetermined supply position.

6. The parts tray conveying system as defined in claim 1, wherein said elevator means further includes a vertically extending frame,
 a vertically situated air cylinder attached to said frame of said elevator means and having said vertically movable member slidably attached thereon, and
 wherein said plurality of mounting brackets are attached on opposite side portions of said elevating member.

7. The parts tray conveying system as defined in claim 1, wherein said third station comprises:
 a first plurality of air cylinders;
 a pair of chuck members, each provided at its lower portion with a tray receiving plate;
 a pair of block members each connected to one of said pair of chuck members at one end and to one of said first plurality of air cylinders at an end opposite thereto, said first plurality of air cylinders being for opening and closing said pair of chuck members; and
 a second plurality of air cylinders situated on front and rear portions of said pair of chuck members for pushing said occupied tray.

8. The parts tray conveying system as defined in claim 1, wherein said fourth station comprises:
 a pair of rails;
 a first air cylinder provided between said rails;
 a drawing hook rotatably supported and adapted to be moved by said first air cylinder;
 a second air cylinder situated under said first air cylinder for discharging said empty trays;
 a mounting plate adapted to be moved by said second air cylinder and having a plurality of rotatable hooks attached thereto;
 a pair of third air cylinders having respective movable rods for lifting and lowering said empty trays under the stacked condition; and
 a pair of retainer plates rotatably connected to a bracket mounted on respective rods of said pair of third air cylinders.

* * * * *